Figure 1:
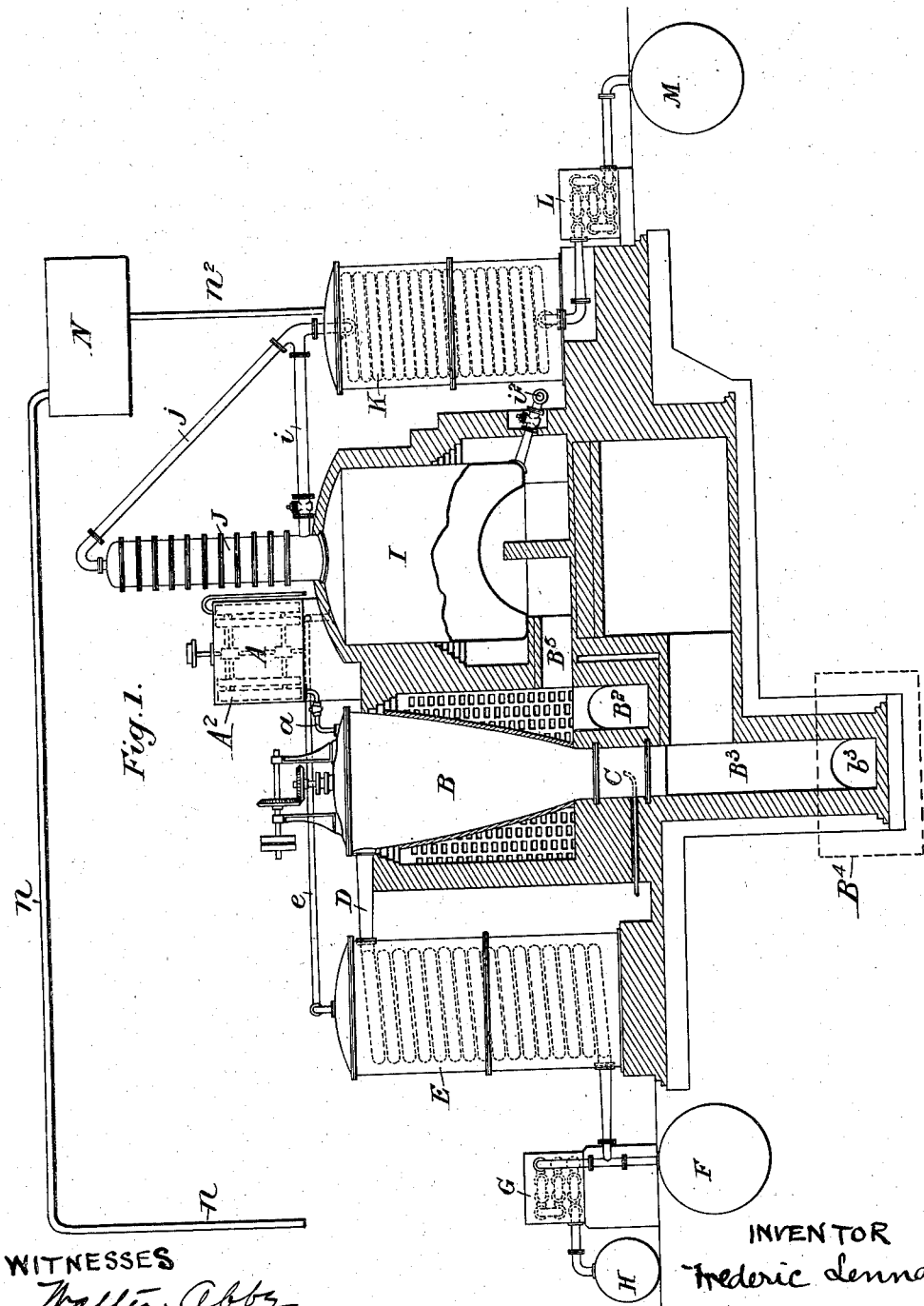

No. 659,076. Patented Oct. 2, 1900.
F. LENNARD.
PROCESS OF SEPARATING FREE CARBON FROM TAR.
(Application filed Aug. 22, 1899.)
(No Model.) 3 Sheets—Sheet 1.

WITNESSES
Walter Abbs
E. Alheim

INVENTOR
Frederic Lennard
by his attorneys
Howson and Howson

No. 659,076. Patented Oct. 2, 1900.
F. LENNARD.
PROCESS OF SEPARATING FREE CARBON FROM TAR.
(Application filed Aug. 22, 1899.)

(No Model.) 3 Sheets—Sheet 2.

WITNESSES
Walter Abb_
E. Alheim

INVENTOR
Frederic Lennard
by his Attorneys
Howson and Howson

UNITED STATES PATENT OFFICE.

FREDERIC LENNARD, OF LONDON, ENGLAND.

PROCESS OF SEPARATING FREE CARBON FROM TAR.

SPECIFICATION forming part of Letters Patent No. 659,076, dated October 2, 1900.

Application filed August 22, 1899. Serial No. 728,098. (No specimens.)

*To all whom it may concern:*

Be it known that I, FREDERIC LENNARD, chemical manufacturer, a subject of the Queen of Great Britain and Ireland, and a resident of 70 Gracechurch street, in the city of London, England, have invented certain new and useful Improvements in the Process for the Separation of Free Carbon from Tar, (for which I have applied for a patent in Great Britain, No. 2,183, dated January 31, 1899,) which invention is fully set forth in the following specification.

Tar, and especially coal-gas tar, contains free carbon, which retards the distillation of the tar, causes undue wear and tear of the distilling apparatus, and reduces the value for agglomerating purposes of the pitch produced from distillation of the tar.

My invention has for its object to separate the free carbon from the tar, so as to increase the value of the pitch produced when the tar is distilled and to obtain the said free carbon in a valuable form for electrical and other purposes.

According to my invention I dilute the tar from which the carbon is to be separated with naphtha, light oil, or any other suitable oil or spirit of low specific gravity to such an extent as to diminish the viscous nature of the tar and produce a mixture having an appreciably-lower vaporizing-point than the tar alone has. Having so diluted the tar, I pass the mixture into a chamber or retort externally heated to the volatilizing-point of the mixture and subject it to the action of steam, which has the effect of depriving it of practically all its liquid portion, the free carbon being deposited in the form of a rough powder. The chamber or retort in which the mixture is so treated is preferably of somewhat-conical form, smaller at bottom than at top, and is provided with a rotating scraper and with a spreader at top to distribute the mixture of tar and light oil or spirit, the steam being admitted by a jet or jets projecting upward from the lower part of the chamber or retort, the bottom of which is provided with a seal, which may be constituted, for example, by a water-well or an air-tight receptacle, into which the carbon falls and from which it can be removed at intervals. The volatile products driven off from the mixture can be condensed, the lighter oil or spirit being recovered for reuse and the remainder being conducted (if desired, through an interchanger through which the aforesaid volatile products pass) to a still, which can be heated by the otherwise waste heat from the aforesaid chamber or retort. The tar to be treated can be preheated, if desired, by passing it through an interchanger through which the products of distillation pass from the still.

The accompanying drawings represent apparatus suitable for the purposes of my invention.

Figure 2:
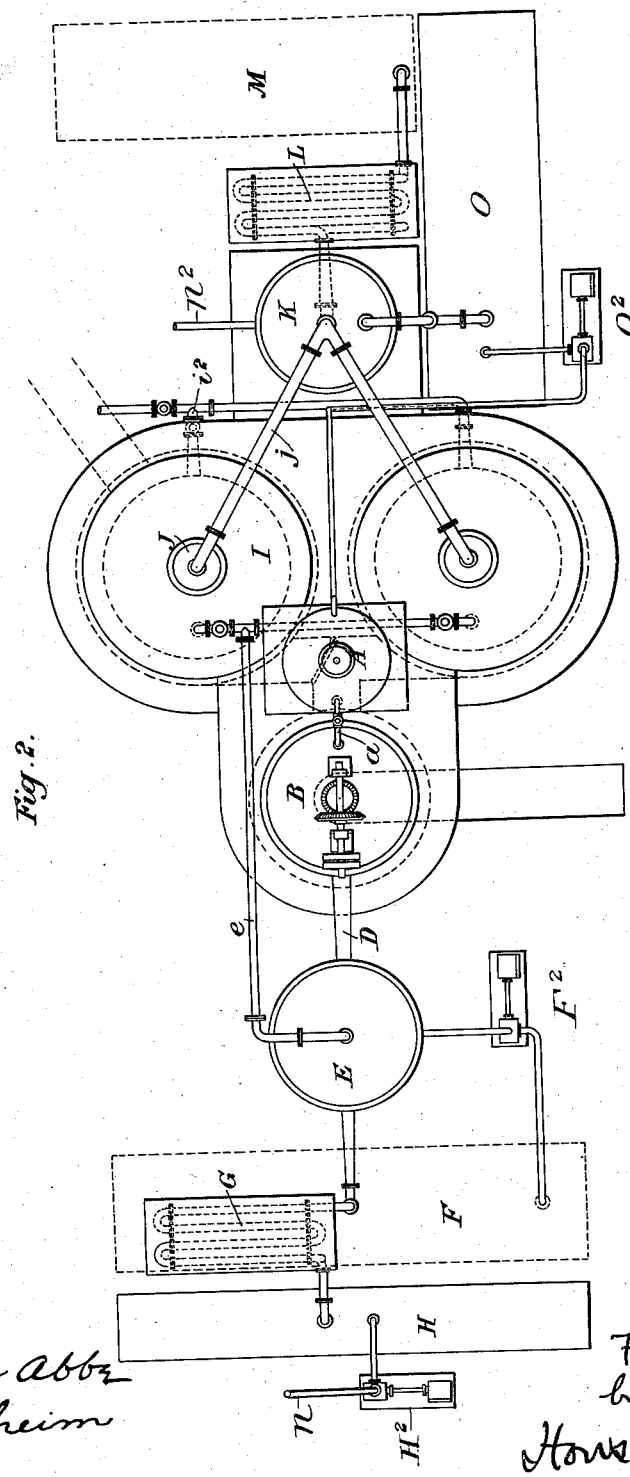
Figure 3:
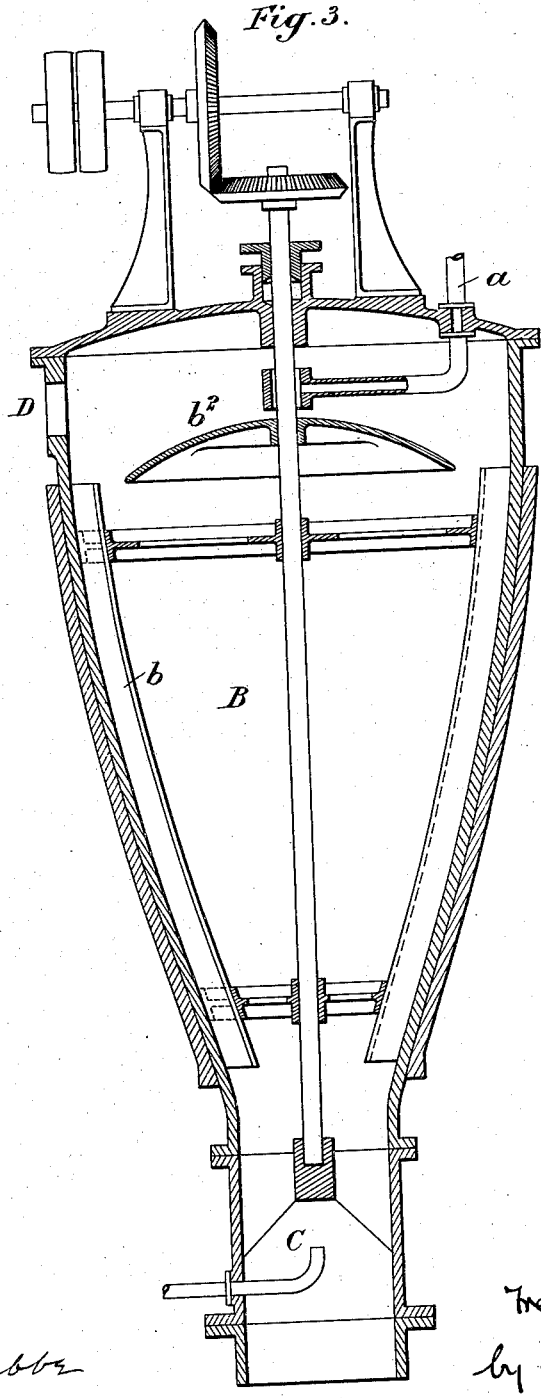

Figure 1 is a sectional elevation, Fig. 2 a plan, and Fig. 3 an enlarged section, of the chamber or retort B.

The mixture of tar and oil or spirit of low specific gravity, preferably previously heated, as hereinafter described, is supplied from a tank A (provided with an agitator $A^2$) by the pipe $a$ to the chamber or retort B, heated by the furnace $B^2$ and provided with a rotating scraper $b$ and with a spreader $b^2$.

C is a pipe and jet by which steam is admitted and projected upward from the lower part of the chamber or retort B, the bottom of which is provided either with a water-well $B^3$, constituting a seal into which the carbon falls and from which it can be removed as required by the outlet $b^3$, as shown in full lines in Fig. 1, or with an air-tight receptacle $B^4$, as shown in dotted lines in that figure. The volatile products driven off from the chamber or retort B pass off by the pipe D and through the coil of the interchanger and condenser E, from which the condensed portion passes into the receiver F, the uncondensed portion passing through the coil in the auxiliary condenser G and thence into the receiver H, from which it is pumped by the pump $H^2$ through the pipe $n$ into the mixing-tank N for mixing therein with a further quantity of tar. The condensed products from the receiver F are pumped by the pump $F^2$ around the outside of the coil in the interchanger and condenser E, so that they may serve as the condensing medium of the products from the chamber or retort B, which, as aforesaid, pass through the said coil, the said condensed products then passing by the pipe $e$ to a still I, which can be heated by the hot products of combustion from the furnace B³, which heats the chamber or retort B, the said products passing through the flue or passage B⁵. The first or lighter products of distillation from this still I are passed through the fractionating-column J and by the pipe j through the coil in the interchanger and condenser K and thence through the auxiliary condenser L into the receiver M or receivers. The heavier or last portions of distillation from the still I afterward pass through the pipe i and interchanger and condenser K and auxiliary condenser L into a receiver or receivers therefor. The residue left in the still is withdrawn by the outlet i² for use or for further treatment, if required. I preferably employ the mixture of tar and oil or spirit as the condensing medium for the interchanger and condenser K, so that the said mixture may be heated before being introduced into the retort. This mixture passes from the tank N into the interchanger and condenser K by way of the pipe n², and after flowing around the outside of the coil of such interchanger and condenser it overflows into a vessel O, from which it is pumped by the pump O² into the tank A, which, as previously described, supplies the retort B.

If desired, instead of the mixture of tar and oil or spirit being used as the condensing medium in the vessels K and E, as previously described, water or other condensing agent may be employed for the purpose, though I prefer the former arrangement, because while the said mixture serves as the condensing agent it at the same time becomes heated preparatory to its treatment in the retort B and still I.

Without intending to limit myself thereto, but by way of example only, I will state that the following detailed procedure may be employed in carrying out my invention: One thousand gallons of crude coal-tar are mixed with an equal quantity of coal-tar naphtha of about from 860° to 950° specific gravity, and the mixture is kept thoroughly agitated. This mixture after being slightly warmed by a steam-coil is then fed in a small stream into the retort hereinbefore described (which has been heated to a temperature of 500° centigrade) and falls onto the heated sides of the said retort, which causes volatilization of the liquid portion, the free carbon adhering to the walls of the retort and being removed by the revolving scraper, so that it falls into the air-tight chamber, from which it is taken from time to time.

I claim as my invention—

The process of distilling tar to separate the free carbon therefrom, consisting in diluting the tar with an oil or spirit which will, in combination with the said tar, produce a mixture having an appreciably-lower vaporizing-point than the tar alone has, and subjecting the mixture to the action of heat and of steam, and thereby effecting simultaneously the volatilization of the liquid portion and the deposit of the free carbon, substantially as described.

In testimony whereof I have signed this specification in the presence of two subscribing witnesses.

F. LENNARD.

Witnesses:
 WILLIAM FREDERICK UPTON,
 JOHN EDWARD NEWTON.